Patented Apr. 27, 1954

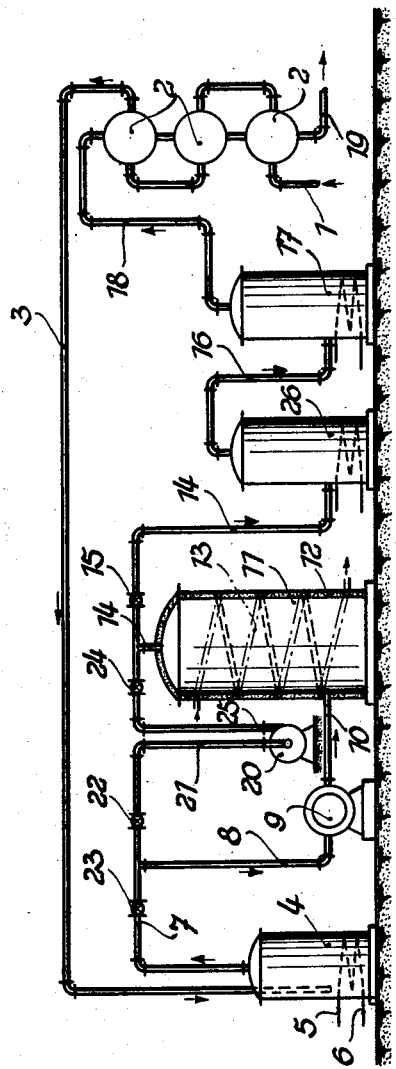

2,676,999

UNITED STATES PATENT OFFICE 2,676,999

PURIFICATION OF BENZENE OR ITS HOMOLOGUES

Hermann Schwenke, Kamen-Westphalia, Germany, assignor, by mesne assignments, to Koppers Company, Inc., Pittsburgh, Pa., a corporation of Delaware Application September 28, 1949, Serial No. 118,315

Claims priority, application Germany October 1, 1948

8 Claims. (Cl. 260—674)

The present invention relates broadly to the purification of benzene or its homologues and more particularly to the purification of said hydrocarbons in the vapour phase.

The removal of resin forming agents (unsaturated hydrocarbons) and other impurities from raw benzene for the purpose of recovering motor benzene has previously been effected by treatment with strong sulphuric acid followed by washing with soda lye. This method of operation is above all, attended with considerable losses since in a secondary reaction benzenesulphonic acid is formed which may frequently amount to 6–8% of the raw benzene being treated. Moreover, the working up of the waste acid from the benzene purification is troublesome since it has not yet been found possible to find an effective use for the material separated by the sulphuric acid.

It has already been proposed to free benzene from sulphur compounds by passing it in the vapour phase over solid contact substances. It has for example been proposed to conduct raw benzene, in the form of vapour at temperatures of 400–450° C., over minette. This working temperatures however, in practice makes it necessary to employ an apparatus provided with gas firing or the like which involve the operation in considerable danger.

An object of the present invention is to provide for such improvements in the purification of benzene or its homologues which will render the purification of said hydrocarbons in the vapour phase more efficiently at temperatures usual to distillation practice so that apparatus and heating means usual in the operation of by-product or distillation plants may be employed.

According to an essential feature of the invention the purification of benzene or its homologues is effected by vapourising the raw material to be purified and bringing the vapours so produced, in a heated condition, into contact with a solid mixture of alkaline ferric hydroxide and fuller's earth or the like (aluminium magnesium silicate) at increased temperature.

Considerable advantages are obtained by the employment of the invention. Firstly, as regards operating temperature, it is sufficient in general to treat vapours at temperatures below about 250° C., that is, in a range within which the heating of the apparatus can be carried out with the high pressure steam normally available in industry. Preferably, the treatment is carried out at a temperature of between 100 and 150° C. This temperature lies only slightly above the distillation temperature. The composition and the properties of the raw materials and the impurities determine what treatment temperature, within the stated limits in the process according to the invention gives the best effect both as regards the removal of impurities and also the durability of the solid treatment media. Generally, the lower the temperature maintained, the greater is their life.

It is advantageous previously to rectify the hydrocarbon oil to be treated and to withdraw the first running separately. This first running consists in the case of the preparation of benzene for the purpose of obtaining motor benzene or purified benzene, of materials boiling below 79° C. and contains chiefly carbon disulphide and cyclopentadiene. The benzene or the like freed from the first running is then vaporised and the vapour treated according to the invention.

The solid purification masses with which the vapours of the hydrocarbon oil (benzene and/or homologues) to be purified are brought into contact contain as a substantial constituent alkaline ferric hydroxide and fuller's earth (aluminium magnesium silicate). The ferric hydroxide is preferably employed in the form of the so-called purifying mass for industrial gas (for example, coal gas) and particularly the so-called fine purification mass which serves for the removal of organic sulphur compounds from such gases, and from which valuable hydrocarbons are formed by synthesis. Such a mass consists for example of a mixture of 700 kilograms of bog iron or the like and 300 kilograms of soda. These constituents are mixed hot and the resulting product preferably granulated into particles which for the purpose of the treatment of hydrocarbon vapours according to the invention may be of about 0–15 millimetres.

The granular alkaline ferric hydroxide mass is associated with fuller's earth in a catalyst bed. Advantageously the two are simply mixed together. It is however, also possible to arrange the material and the fuller's earth in thin layers in alternate sequence in the treatment apparatus, as for example on perforated partitions. The two materials may also be arranged loosely in the treatment apparatus and with such a grain size that a bed is formed which is kept in movement by the vapours passing therethrough. For this purpose the grain size of the ferric hydroxide mass and the fuller's earth must be so chosen that a substantial separation of the constituents of the mixture cannot occur when the mixture is moved or stirred up by the vapours.

Instead of fuller's earth other surface active materials can be employed, particularly materials containing clay and silicic acid, such as for example aluminium-magnesium silicate, which may if desired be previously subjected to a special activation, as for example with hydrochloric acid.

After the treatment apparatus is supplied with the mixture of solid materials it is heated to the required reaction temperature in order to prevent undesired condensation of the hydrocarbons, and the hydrocarbon vapours may then be continuously applied thereto. The supply of the vapours to and from the apparatus is carried out in such a way that they flow through the mixture in the apparatus and come into intimate contact with the solid or granular materials.

After the vapours leave the treatment apparatus they are condensed. In the treatment of benzene in this manner a condensate is obtained which may be employed without further treatment as motor benzene.

The loss in hydrocarbon oil through the purification is, in the treatment of benzene according to the process of the invention, about 1.35–1.50% (by weight). The content of resin-forming constituents in the benzene decreases from about 15 mg. in the raw benzene to about 2 mg. or less in the motor benzene. The product of purification is free from sulphur. It shows no further reaction on treatment with sulphuric acid (60–66° Baumé) in the cold.

The purity of the product is sufficient in order for example, to make benzene suitable for combustion engines by a single treatment of the vapours with the fixed purifying mass. If a still higher purity is desired it is possible according to the invention to treat the vapours, after treatment with the solid purifying mass, and without substantial variation in temperature, with hot sulphuric acid (about 64° Baumé), and then with hot soda lye (about 30%) or the like. Through this subsequent treatment the purification loss is increased somewhat, e. g. in the case of benzene, to about 2.5%. The end product is however, of the greatest purity, previously only obtainable with considerably higher losses (5–8%).

By way of example, the process was carried out as follows:

A thousand kg. of a granular mixture of 700 kg. of bog iron ore and 300 kgs. of soda, which may be in the form of the so-called Lux-mass, were mixed in the unscreened condition with a thousand kg. of fuller's earth, likewise unscreened. The treatment temperature at which the vapours produced by distillation of the raw benzene after separation of the first running, are brought into contact with the mixture, lay between 100 and 150° C. With continuous operation 600 to 800 T. of raw benzene and more can be purified with the mixture. The resin-former test of the raw benzene amounted to 15 mg. By the treatment of the benzene vapours the resin former test dropped to 2 mg. The product fulfilled the requirements for motor benzene.

It is advantageous to withdraw the vapours of the benzene, toluene and xylene, including the higher homologues, separately from the treatment according to the invention, the treatment temperatures naturally being so chosen for this purpose, that the treated hydrocarbons remain in the vaporised condition.

In certain conditions the treatment according to the invention can be employed in combination with a fractional distillation, the vapour outlets of each fraction being provided with an apparatus for treatment of the vapours with the described solid mixture, from which the vapours then pass into the condenser of the usual kind.

The drawing illustrates diagrammatically an apparatus suitable for carrying out the purification of benzene or its homologues according to the invention.

The hydrocarbon oil to be purified, for example, raw benzene, enters the apparatus at 1. It then goes through the heat exchanger 2 and passes in the preheated condition through the conduit 3 into the distillation vessel 4. In this the liquid is indirectly heated by steam which is introduced through the conduit 5 and the resulting condensate flows away through the pipe 6.

The hydrocarbon vapours produced in the vessel 4 are drawn off through the pipe 7 and pass through the pipe 8 to a superheater 9 in which the vapours are superheated in the desired manner. From the superheater 9 the pipe 10 leads to a closed treatment apparatus 11 which is jacketed externally—as indicated at 12—with an insulating material and is provided with a heating coil 13.

A solid granular mixture of alkaline ferric hydroxide and fuller's earth or the like is arranged in the apparatus 11 on a perforated partition or the like, not illustrated. The vapours come into contact with the filling of the apparatus 11 and then pass out through the pipe 14 which is controlled by a valve 15. The vapours then pass into an apparatus 26 in which they are brought into contact with hot sulphuric acid at increased temperature, so that no condensation can occur. The vapours then pass through the pipe 16 into an apparatus 17 in which they are treated with hot soda lye or the like. The purified vapours finally pass through the pipe 18 to the heat exchanger 2, constructed as a cooler, and the condensate may be withdrawn at 19.

In order to preheat the apparatus 11 and its solid granular contents to the correct operating temperature a special circulating fan 20 may be provided. After opening the valve 22 and closing the valve 23, this fan moves air or steam through the pipes 21, 8. to the superheater 9. The heated vapours then flow through the apparatus 11 and there give up their heat, whereafter they are returned through the pipe 14, after closure of the valve 15 and opening of the valve 24, through the pipe 25 to the fan 20, so that air or other gas or vapours can be circulated through the superheater and the apparatus 11. As soon as the latter has reached the desired temperature the blower 20 is stopped, the valves 22 and 24 closed and the valves 23 and 15 opened, and the treatment of the vapours from the vessel 4 can then begin.

The invention as hereinabove set forth is embodied in particular form and manner but may be variously embodied within the scope of the claims hereinafter made.

I claim:

1. In a process for removing resin-forming constituents from material selected from the class consisting of raw benzene and a benzene, toluene, or xylene fraction thereof, for the recovery of motor fuel from said material, the steps of: vaporizing said materials after separation of fore-runnings which boil below 79° C., and passing the vapors through a solid material comprising alkaline ferric hydroxide and surface active silicious catalyst at a temperature below 150° C. but above 100° C. to remove resin-forming constituents from said material, and recovering the so purified material.

2. In a process for removing resin-forming constituents from material selected from the class consisting of raw benzene and a benzene, toluene, or xylene fraction thereof, for the recovery of motor fuel from said material, the steps of: rectifying said material to take off as forerunnings impurities, including carbon disulphide and cyclopentadiene, which boil below 79° C.; vaporizing the rectified material and passing the vapors through solid material comprising alkaline ferric hydroxide and surface active silicious catalyst at a temperature below 150° C. but above 100° C. to remove resin-forming constituents from said material, and recovering the so purified material.

3. A process as claimed in claim 2, and in which the alkaline ferric hydroxide is in the form of the so-called fine purification Lux-mass of granular particles of bog iron and soda ash.

4. A process as claimed in claim 2, and in which the alkaline ferric hydroxide is a mixture of ferric hydroxide and soda ash, and in which the surface active catalyst is in admixture with the alkaline ferric hydroxide.

5. A process as claimed in claim 2, and in which the surface active catalyst is an acid activated aluminum-magnesium silicate.

6. A process as claimed in claim 2 and in which the recovered material is thereafter treated first with hot sulfuric acid and then with a hot soda lye solution to further purify the material of residual resin-forming constituents.

7. A process as claimed in claim 2, and in which the vaporized material, as treated, is raw benzene from which the toluene and xylene fractions have not been separated prior to passage through said solid material.

8. A process as claimed in claim 2, and in which the vaporized material to be treated is raw benzene fractionated and the separated fractions passed as such through said solid material.

References Cited in the file of this patent

UNITED STATES PATENTS

| Number | Name | Date |
|---|---|---|
| 1,759,812 | Gray | May 20, 1930 |
| 1,882,000 | Cross | Oct. 11, 1932 |
| 1,944,877 | Darlington | Jan. 30, 1934 |
| 2,134,241 | Susselbeck | Oct. 25, 1938 |
| 2,151,721 | Schulze | Mar. 28, 1939 |
| 2,433,426 | Capell et al. | Dec. 30, 1947 |
| 2,559,323 | Spillane | July 3, 1951 |

OTHER REFERENCES

"Gas Age-Record," vol. 58, pages 73-6, July 17, 1926.